United States Patent [19]

Hwang

[11] Patent Number: 4,617,093
[45] Date of Patent: Oct. 14, 1986

[54] METHOD AND APPARATUS FOR SEPARATING COMPONENTS OF A MIXTURE

[75] Inventor: Sun-Tak Hwang, Cincinnati, Ohio

[73] Assignee: University of Cincinnati, Cincinnati, Ohio

[21] Appl. No.: 578,087

[22] Filed: Feb. 8, 1984

[51] Int. Cl.[4] .......................... B01D 3/04; B01D 15/00
[52] U.S. Cl. ..................................... 203/100; 203/41; 203/71; 203/86; 203/DIG. 9; 202/158; 202/173; 202/235; 159/906; 159/903
[58] Field of Search ............... 202/158, 235, 173, 180, 202/237; 261/104, 75, 148; 203/100, DIG. 9, 41, 71, 86; 165/104.14, 104.26; 55/74; 159/906, 903

[56] References Cited

U.S. PATENT DOCUMENTS

| 3,458,405 | 7/1969 | Akens | 202/236 |
|---|---|---|---|
| 3,496,996 | 2/1970 | Osdor | 202/236 |
| 3,792,843 | 2/1974 | Stage | 202/158 |
| 3,971,634 | 7/1976 | Ranken et al. | 165/104.14 |
| 4,186,796 | 2/1980 | Usui | 165/104.26 |
| 4,234,391 | 11/1980 | Seader | 203/26 |
| 4,235,679 | 11/1980 | Swaidan | 203/DIG. 1 |
| 4,336,837 | 6/1982 | Koenig | 165/104.26 |
| 4,348,261 | 9/1982 | Saari | 203/100 |
| 4,372,818 | 2/1983 | Kaganovsy et al. | 202/158 |

FOREIGN PATENT DOCUMENTS

| 0010253 | 4/1980 | European Pat. Off. | 202/158 |
|---|---|---|---|
| 2420731 | 11/1979 | France | 159/15 |
| 0028161 | 6/1981 | Japan | 203/10 |
| 0259042 | 4/1970 | U.S.S.R. | 203/89 |
| 0800577 | 1/1981 | U.S.S.R. | 165/104.26 |
| 0850099 | 7/1981 | U.S.S.R. | 203/89 |

Primary Examiner—S. Leon Bashore
Assistant Examiner—V. Manoharan
Attorney, Agent, or Firm—Wood, Herron & Evans

[57] ABSTRACT

A method and apparatus for separating at least one component of a mixture from another without the aid of gravity comprises, in one embodiment, a heat pipe structure having an inlet and spaced outlets, a wick element disposed within the heat pipe for inducing a capillary flow of condensed phase mixture in liquid form therealong and spaced heating and cooling elements for creating zones of higher and lower temperature, respectively, within the heat pipe structure. In an alternate embodiment, a sorbent column is provided having an inlet and spaced outlets, a sorbent material disposed along the inner wall of the column for inducing a flow of adsorbed mixture therealong and spaced heating and cooling elements for creating zones of higher and lower temperature. The mixture is introduced into the heat pipe structure or sorbent column and the heating and cooling elements induce a countercurrent flow in which at least one component of the mixture in vapor phase migrates toward the zone of lower temperature and at least one other component in condensed phase migrates toward the zone of higher temperature. The components, in concentrated form, are removed from the heat pipe or sorbent column structures through the outlets at the zones of higher and lower temperature.

14 Claims, 7 Drawing Figures

METHOD AND APPARATUS FOR SEPARATING COMPONENTS OF A MIXTURE

BACKGROUND OF THE INVENTION

This invention relates to a method and apparatus of continuous separation of the components of a mixture, and, more particularly, to a compact, highly efficient apparatus and method operable to separate the components of a binary mixture without the aid of gravity.

Distillation is the most commonly used separation technique in petroleum refineries, chemical plants and other process industries. The main purpose of distillation is the separation of volatile components from nonvolatile components, or the separation of the mixture of volatile components. The most common distillation technique is fractional distillation in which one or more components of a mixture in vapor form are separated from other components in liquid form in a countercurrent or stepwise countercurrent operation.

Referring to FIG. 1, a simplified example of a continuous fractional distillation system is illustrated. The system comprises a fractionating column filled with packing material such as glass, ceramics, polymers, metal or other materials which are not affected by the operating conditions within the column. Alternately, the distillation column may be provided with a plurality of spaced trays formed in any one of a number of known configurations. A still or reboiler is connected at the bottom of the fractionating column and is provided with a suitable source of heat such as steam. An outlet line is connected to the top of the fractionating column leading to a condenser.

In a simple continuous fractional distillation operation, a feed mixture to be separated is continuously introduced approximately midway along the fractionating column, and flows downwardly by gravity toward the bottom. A portion of the feed mixture from the column is vaporized in the still and the vapor rises vertically upwardly from the bottom of the column making contact with the descending liquid. When it reaches the top of the column, the vapor exits through the outlet line and is condensed in the condenser. A portion of that condensate is removed as product and the remainder is returned to the top of the column in liquid form, known as reflux, which then flows downwardly by gravity within the column.

The flow rates of liquid and vapor are adjusted within the column so that near the upper end of the column the liquid has a higher concentration of more volatile components than corresponds to equilibrium with the vapor with which it is in contact. Therefore, the more volatile components of the feed material pass from the liquid to vapor stage, and the less volatile components pass from the vapor to liquid stage producing a countercurrent flow of more volatile components toward the top of the column and less volatile components toward the bottom of the column. The vapor becomes progressively more enriched in volatile components as it flows to the top of the column, and the liquid becomes more concentrated in less volatile components as it flows to the still where it is removed as a bottoms product.

The separation of the components of a feed mixture in a continuous fractional distillation system depends on the relative volatility of the feed components, the ratio of the liquid to vapor in the column or the fraction of condensate returned as reflux compared to that removed as product, and the effectiveness of the transfer between the liquid and vapor phase provided by the column. Relative volatility of the feed components is not subject to change, and the fraction of condensate or reflux returned to the column as compared to the product removed is essentially an operating parameter. Therefore, improvement in the efficiency of the column in effecting a transfer between the liquid and vapor phases of the feed mixture is the aspect of distillation system operation which has received the most attention in recent years. A common goal of all fractional distillation columns, including both tray tower and packed tower types, is to provide a large surface area of contact between the liquid and the vapor phase. Numerous plate designs have been proposed to achieve more complete contact between the descending liquid and the ascending vapor. Packed columns, using a variety of materials, have been designed to create a similar agitated countercurrent flow of liquid and vapor.

Despite recent improvements in fractional distillation column design, problems including flooding, liquid dispersion and interstage cooling remain. In addition, separation efficiency is limited by the physical height of the column. It has been found that the separation efficiency of both tray and packed columns, particularly for feed mixtures having components with relatively close boiling points, increases with the height of the column wherein additional surface area of contact between the liquid and vapor phases is provided. However, increasing the height of fractionating columns or towers adds significantly to the cost of the distillation system and may present a problem in installations having limited available space. A further disadvantage of all known continuous fractionating columns is that they depend on the operation of gravity to produce a countercurrent flow of descending liquid and ascending vapor, and therefore must be oriented vertically to operate.

As is well known, heat pipes are commonly used in heat exchangers and other heat transfer devices to transmit heat from one end of the heat pipe to the other. In the vast majority of applications, a pure liquid is used to convey the heat within the heat pipe. A countercurrent flow of the pure liquid in vapor and liquid phase is established in the heat pipe, and since the liquid and vapor are in continuous contact, there is a continuous exchange of mass between the two phases. It has been found that if a binary mixture is placed in the heat pipe, the concentration of the components forming the mixture will be polarized such that the more volatile component is concentrated at the low temperature end of the heat pipe and the less volatile component of the mixture is concentrated at the higher temperature end. If the heat pipe does not contain inlets or outlets, a total reflux situation is produced at steady state.

The operation of a two-component heat pipe using a binary mixture resembles that of a fractionating column at total reflux. However, a fundamental difference exists between the two systems resulting from the different roles played by their operating pressures. The system pressure in a distillation column is preset, typically at atmospheric pressure. The pressure inherently developed inside the closed system of a heat pipe, however, is influenced by a variety of system parameters, such as the type of mixture placed in the heat pipe. Unlike fractionating columns, heat pipes are closed systems which inherently develop their own pressure differential to drive the vapor phase of the mixture in one direction, and the liquid phase in the opposite direction along a wick structure, independently of gravity or other external forces. While separation of the components of a binary mixture is achieved in a two- component heat pipe, known heat pipes of that type have been used exclusively to transmit heat from one end to the other.

Another type of separation apparatus used in the process industry is the sorbent column. Typical sorbent columns include a sorbent material such as silica gel or activated charcoal in which each component of a mixture moves in the same direction in the adsorbed phase. While sorbent columns provide some advantages over distillation columns, their separation efficiency is dependent on the permeation rates of the components to be separated. In addition, the operation of known sorbent columns is not continuous but limited to batch operations or an alternating operation with both adsorption and desorption cycles.

SUMMARY OF THE INVENTION

In a broad aspect of this invention, a method and apparatus is provided in which a temperature gradient is developed in a cylinder structure of essentially any cross section producing zones of higher and lower temperature. A mixture having separate components is introduced through at least one inlet into the cylinder, and, induced by the temperature gradient, a countercurrent flow of the components in vapor phase and condensed phase is developed resulting in the formation of concentrations of at least one of the components at opposite ends of the cylinder. The components in concentrated form are recovered through at least one outlet disposed at each end of the cylinder.

In another aspect of this invention, a method and apparatus is provided in which a heat pipe is adapted to separate and recover the components of a mixture in a continuous distillation operation. The heat pipe is formed with at least one outlet at either end to recover the components in pure or concentrated form, and at least one inlet to receive the mixture to be separated.

In a more specific aspect of this invention, a method of distillation for separating the components of a mixture according to their volatility is provided consisting of the steps of first introducing the mixture into an inlet of a heat pipe structure formed with separate outlets for the removal of each of the components to be separated. A temperature gradient is developed along the heat pipe structure forming a zone of higher temperature at one location and a zone of lower temperature at another location. The temperature gradient or differential within the heat pipe structure induces a countercurrent flow of the more volatile components in vapor phase toward the zone of lower temperature and the less volatile components in condensed phase, as a liquid, toward the zone of higher temperature. Continuous contact and mass transfer between the liquid and vapor phases of the components results in the migration of a relatively high concentration of the less volatile components of the mixture toward the zone of higher temperature within the heat pipe structure, and a relatively high concentration of the more volatile components toward the zone of lower temperature within the heat pipe structure. The outlets are positioned at or adjacent to the zones of higher and lower temperature to remove each of the components in concentrated form from the heat pipe structure. Outlets placed outside of either temperature zone would result in the recovery of the components in varying degrees of purity.

In a further aspect of this invention, an apparatus is provided to accomplish the method of separation of the two components of a binary mixture according to their relative volatility. The apparatus comprises a heat pipe structure preferably consisting of at least one cylinder having an inlet and a pair of spaced outlets. Disposed along the inner wall of a cylinder is a wick structure adapted to induce a capillary flow of liquid therealong. A heating coil and cooling coil, or other suitable heating and refrigerating apparatus, are spaced along the cylinder so as to form a heated zone and a cooled zone. According to one embodiment of the method of this invention, the more volatile component is vaporized at the heated zone of the cylinder creating a pressure differential within the cylinder which drives the more volatile component in vapor phase toward the cooled zone. The less volatile component migrates in condensed phase, as a liquid, along the wick structure toward the heated zone of the cylinder, due to the capillary force developed in the wick structure which drives the liquid. At least one outlet is positioned along the cylinder at each end to remove the two components from the heated and cooled zones.

In accordance with a further broad aspect of this invention, a method is provided for the continuous separation of components of a mixture based on the sorbancy of each component. The mixture is first introduced into a cylinder structure wherein a temperature differential is created forming a heated zone and a cooled zone. A countercurrent flow is developed within the cylinder structure wherein the molecules of the more sorbable components are adsorbed in a sorbent medium and diffuse as a condensate, in adsorbed phase, toward the zone of higher temperature. The less sorbable components of the mixture migrates in vapor phase toward the zone of lower temperature. The more and less sorbable components of the mixture become concentrated at the zones of higher and lower temperature, respectively, where they are removed by outlets formed in the cylinder structure thereat.

In a further more specific aspect of this invention, an apparatus is provided for practicing the method of separating more and less sorbable components of a mixture. The apparatus comprises a cylinder structure, preferably including at least one individual cylinder, having any one of a variety of cross sections, wherein at least one inlet for receiving the mixture is positioned between at least two outlets. Heating and cooling means, such as heating and refrigerating coils or similar apparatus, are disposed at spaced locations along the cylinder so as to form a zone of higher temperature and a zone of lower temperature. A sorption medium such as silica gel, microporous glass, molecular sieve, alumina, zeolite, compressed graphite, microporous metal or activated charcoal is disposed within the cylinder, preferably along its wall. The temperature differential within the cylinder induces a countercurrent flow of the components wherein the molecules of the more sorbable components are adsorbed in the sorbent medium and migrate by diffusion as a condensate, in adsorbed phase, toward the heated zone of the cylinder. Simultaneously, the less sorbable components are vaporized at the heated zone creating a pressure differential within the cylinder which drives the less sorbable components in vapor phase toward the zone of lower temperature. Concentrations of the more and less sorbable components of the mixture are produced at the zones of higher and lower temperatures, respectively, and are removed by the outlets formed in the cylinder structure thereat.

The method and apparatus of this invention in its more specific aspects involves the formation of a separation apparatus comprising a group of several cylinders arranged in a parallel or series connection. In one embodiment, a group of cylinders is provided, each having an inlet to receive the binary mixture, and a separate outlet at either end for withdrawing each of the components of the mixture. The cylinders are arranged such that the outlets for one of the components are connected to a common drain line and the outlets for the other of the components are connected to a second common drain line. Each cylinder in this embodiment is provided with a separate mixture inlet.

In an alternate arrangement, a separation apparatus is formed by a group of cylinders arranged in series. Each cylinder is provided with an outlet which connects directly to an immediately adjoining cylinder to provide a flow of components of the mixture directly from one cylinder to the other. Each cylinder also has an inlet connected from the immediately adjacent cylinder to receive other components of the mixture flowing countercurrently to the first component from one cylinder to the other. The mixture is injected at a single location into the separation apparatus.

In a further specific aspect of this invention, a cylinder is provided with heat absorbing material along one side of the absorption of solar energy to form a zone of higher temperature. The opposite side of the cylinder is placed in the shade to form a zone of lower temperature. This arrangement provides an alternate means for creating a temperature differential within the cylinder so as to induce the desired countercurrent flow of components for separation.

The method and apparatus of this invention, in its various aspects, provides a highly efficient, easily operated separation system employing a cylinder structure for separating and recovering the components of a mixture in which a continuous countercurrent flow of the components in condensed phase and vapor phase is achieved without the need for gravity or other external means to drive the vapor phrase and condensed phase to different zones of the cylinder structure for removal. In separating the components according to their volatility or sorbency, continuous contact is maintained between the vapor phase and condensed phase so as to provide a continuous exchange of mass therebetween. This enables the separation system according to this invention to achieve excellent separation of the components even if they are relatively close in volatility or sorbency.

Unlike known continuous distillation systems, the cylinder structure of this invention may be oriented horizontally rather than vertically since it does not rely on gravity for its operation. This greatly reduces the cost and a physical space required for a separation apparatus, and permits the system of this invention to be made in a compact, portable form for easy transport. One particular application of interest is the use of this invention for component separation in the zero gravity conditions of space exploration, although the system may also be used with the aid of gravity. In addition, the capacity of the separation apparatus according to this invention can be increased by using different arrangements of a number of individual cylinders, oriented in a parallel or series connection as described above.

DETAILED DESCRIPTION OF THE INVENTION

Figure 1:
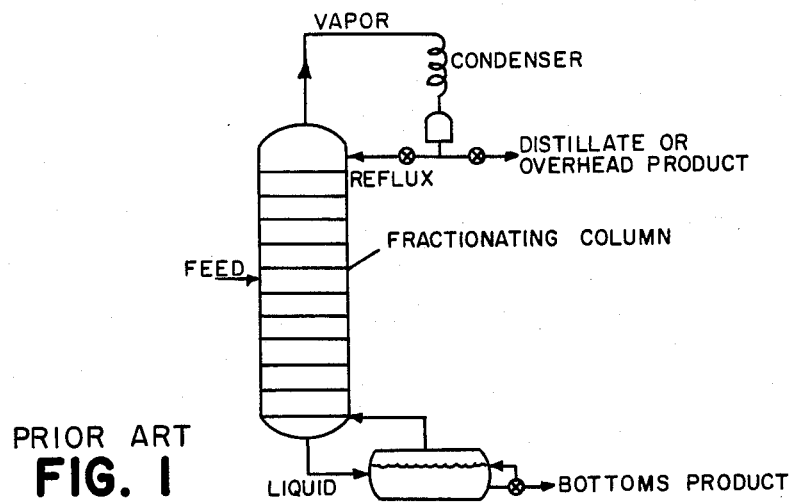
FIG. 1 is a schematic view of a prior art continuous fractional distillation system.

Referring now to FIGS. 2 and 3a-f, an apparatus 10 for separating components of a mixture by distillation comprises a heat pipe structure including a cylinder 12 having an outlet 14 at one end, an outlet 16 at the opposite end, and an inlet 18 spaced between the outlets 14, 16. The cylinder 12 is shown in the Figures with a circular cross section, but it is contemplated that other cross sections could be used including oval, square, rectangular, elliptical and the like. A heating coil 20 is disposed exteriorly of the cylinder 12 adjacent the outlet 14 and cooling coils 22 are wrapped around the outside of cylinder 12 adjacent the outlet 16. Coils 20, 22 are shown for purposes of illustration, and it is contemplated that any suitable heating and refrigerating elements may be provided either internally or externally of cylinder 12, to achieve heating and cooling in the areas of the outlets 14, 16, respectively.

Disposed along the inner wall of the cylinder 12 is a wick structure 24 which may be formed in any of the configurations shown in FIGS. 3a-f. Each of the different wick structures 24 is identified on the drawings and is well known in the art. A detailed explanation of the structure and operation of the wick structures is provided in Chi, S. W., *Heat Pipe Theory in Practice*, McGraw Hill, (1976). For purposes of the present discussion, the wick structure 24 is adapted to receive a liquid and induce a capillary flow of the liquid therealong without the operation of gravity or other external forces. Theories developed for the operation of conventional heat pipes are applicable to determine the size of the capillaries in the wick structure 24 to obtain a given rate and a volume of liquid flow for a liquid of known viscosity and surface tension. Reference should be made in this regard to the article of Shibayama, S. and Morooka, S. "Study on a Heat Pipe" *Int. J. Heat Mass Transfer*, volume 23, pages 1,003 to 1,013 (1980).

The distillation apparatus 10 of this embodiment is operable to separate two components of a mixture 28, such as a binary mixture, according to their volatility. It is assumed for purposes of discussion that the two components of a binary mixture will be separated in accordance with the method and apparatus of this invention, in its various embodiments, but it should be understood that the components of a multi-component mixture could be separated by the invention herein. The operation of apparatus 10 resembles in many respects that of a two-component heat pipe. Initially, the heating coils 20 and cooling coils 22 are activated so that one end of the cylinder 12 forms a heated zone, or evaporator section 30, and the temperature of the opposite end of the cylinder 12 is lowered forming a zone of lower temperature or condenser section 32. The area between the evaporator section 30 and condenser section 32 is an adiabatic section 34.

The mixture 28 is continuously introduced through inlet 18 into the adiabatic section 34, preferably at a location where the composition of the mixture 28 matches that within the cylinder 12. For example, if the mixture 28 is 50% one component and 50% another, the inlet 18 should be positioned within the adiabatic section 34 at a location where the components of the mixture 28 are in the same proportion. The temperature differential within the cylinder 12 induces a countercurrent flow of vapor and liquid in the same manner as in conventional heat pipes. The more volatile component 36 of the mixture 28 is vaporized and leaves the wick structure 24 at the evaporation section 30 of the cylinder 12 due to the heat produced by heating coils 20 thereat. A pressure differential is produced within the cylinder 12 with the vaporization of the more volatile component 36 wherein the pressure at the evaporator section 30 is greater than at the condenser section 32. This pressure differential or drop drives the more volatile component 36 in vapor phase toward the condenser section 32 of cylinder 12. As the more volatile component 36 leaves the wick structure 24, a capillary flow of the less volatile component 38 is induced within the wick structure 24 causing a migration of the less volatile component 38 in condensed phase, as a liquid, from the condenser section 32 toward the evaporator section 30 of cylinder 12. Therefore, a countercurrent flow is established within cylinder 12 in which the more volatile component 36 migrates in vapor phase toward the condenser section 32, and the less volatile component 38 in condensed, liquid phase migrates by capillary action along the wick structure 24 toward the evaporator section 30.

The vapor phase and condensed phase of the mixture 28 are in contact at every location along the cylinder 12 so as to produce a continuous exchange of mass between such phases. As a result, the components 36, 38 of the mixture 28 become polarized such that the more volatile component 36 is heavily concentrated at the condenser section 32 and the less volatile component 38 is heavily concentrated at the evaporator end 30. Unlike fractionating columns which depend on gravity to operate, the distillation apparatus 10 of this invention inherently develops a pressure differential or pressure drop between the condensor section 32 and evaporator section 30 which drives the vapor phase components. Therefore, the cylinder 12 may be operated horizontally or in the complete absence of gravity such as in space. While the separation of the components 36, 38 is achieved in the same manner as a two-component heat pipe, the distillation apparatus 10 according to this invention is adapted to recover the components 36, 38 and receive new mixture 28 continuously. In pure or concentrated form, the more volatile component 36 is removed from cylinder 12 through outlet 16 and the less volatile component 38 is recovered through outlet 14. A steady state condition is maintained within cylinder 12 by introducing the same amount of mixture 28 into the cylinder 12 as the amounts of components 36, 38 which are removed in vapor or condensed phase at each end. It should be understood that additional outlets 14, and 16 could be added to recover the components 36, 38 and more than one inlet 18 may be employed. Of course, if components are removed outside of the zones of the evaporator and condensor sections, the purity of such components would be reduced.

Figure 4:
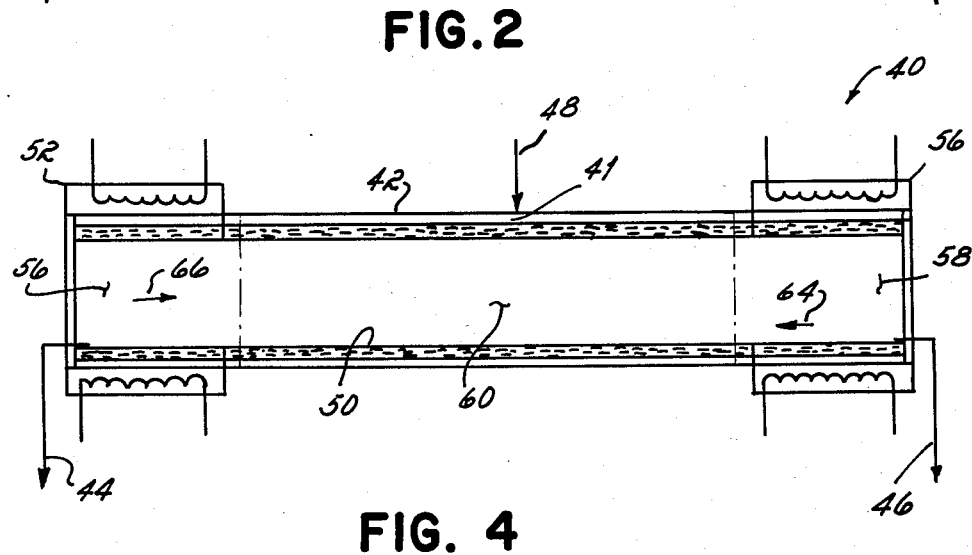
FIG. 4 is a schematic view of an alternate embodiment of an apparatus according to this invention for the separation of the components of a mixture according to their sorption characteristic.
Figure 3:
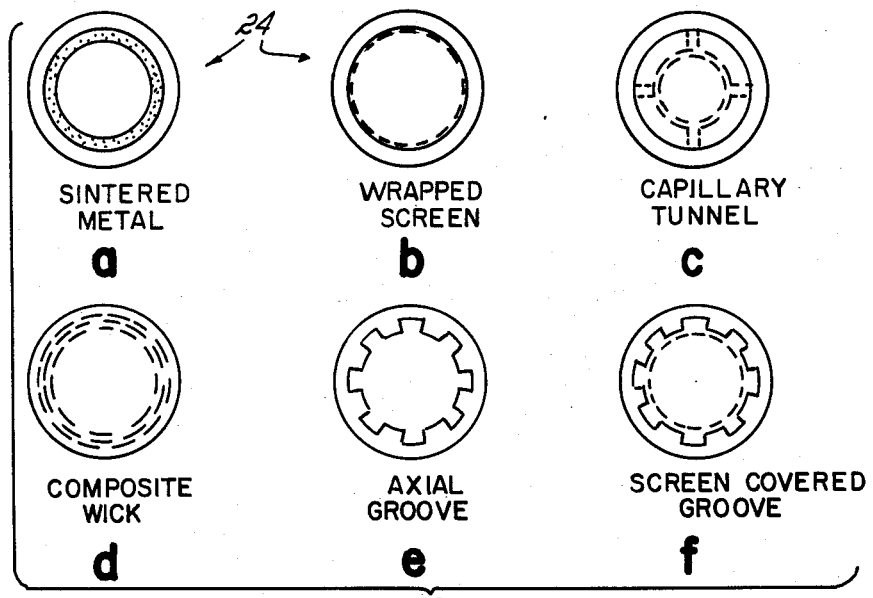
FIGS. 3a-f are cross-sectional views, taken generally along line 3—3 of FIG. 2, showing the wick structure of this invention.

Referring now to FIG. 4, an alternative embodiment for the separation of components of a mixture according to this invention is provided comprising a sorbent column apparatus 40 operable to separate components of a mixture 41 according to the sorbent characteristic of each component. Any mixture 41 such as a binary mixture contains one component which is more or less sorbable than another component, and apparatus 40 is operable to separate such components in relatively pure or concentrated form from one another even where their sorbencies are nearly the same. Apparatus 40 comprises a cylinder 42 having an outlet 44 at one end, an outlet 46 at the opposite end and an inlet 48 therebetween. The cylinder 42 of the sorbent column apparatus 40 may be formed in a variety of cross sections, and is not limited to circular as shown in FIG. 4. In addition, there may be more than one outlet 44, 46 at each end, and/or two or more inlets 48. A sorbent material 50 is disposed along the inner walls of cylinder 42 and is preferably formed of silica gel, activated charcoal, microporous glass, molecular sieves, alumina, zeolite, compressed graphite, microporous metal, or other suitable materials. A heating device 52 is placed about one end of the cylinder 42 adjacent outlet 44, and a cooling device 54 is disposed at the opposite end.

The sorbent column apparatus 40 is operated in the manner similar to that of distillation apparatus 10 described above. The heating and cooling devices 52, 54 are activated creating an evaporator section 56, or a zone of higher temperature at one end of the cylinder 42, and a zone of lower temperature or condenser section 58 at the opposite end thereof. An adiabatic section 60 is formed between the evaporator and condenser sections 56, 58.

In operation, the heating and cooling devices, 52, 54 are activated and the mixture 41, which includes a more sorbable component 64 and less sorbable component 66 is introduced into the cylinder 42 through inlet 48. The less sorbable component 66 is driven from the sorbent material 50 in vapor phase at the evaporator section 56 due to the presence of the heat provided by heating device 52. The vaporization of the less sorbable component 66 creates a pressure difference within the cylinder 42 wherein higher pressure is produced at the evaporator section 56 than at the condenser section 58. This pressure differential forces the less sorbable component 66 to migrate in vapor phase toward the condenser section 58 of cylinder 42. As the less sorbable component 66 is vaporized from the sorbent material 50, a higher concentration of molecules of the more sorbable component 64 is developed at the condenser section 58 of cylinder 42 than at the evaporator section 56. The molecules of the more sorbable component 64 move along the sorbent material 50 by diffusion, in condensed phase, toward the evaporator section 56. In this embodiment, the condensed phase of the molecules moving along the sorbent material 50 are in the adsorbed phase not liquid phase. Moreover, the adsorbed molecules are driven toward the evaporator section 56 by diffusion and not capillary action as in the wick 24 of apparatus 10. A countercurrent flow is thus produced within the cylinder 42 in which the less sorbable component 66 travels in vapor phase toward the condenser section 58 and the more sorbable component 64 migrates in condensed phase toward the evaporator section 56 along the sorbent material 50. This countercurrent flow of the component 64, 66, with continuous mass exchange between the condensed and vapor phases, results in an efficient, relatively complete separation of the two components and a concentration of each at opposite ends of the cylinder 42 where they are removed by outlets 44 and 46. A continuous separation of the components 64, 66 of the mixture 62 is achieved without the aid of gravity or other external forces.

Figure 2:
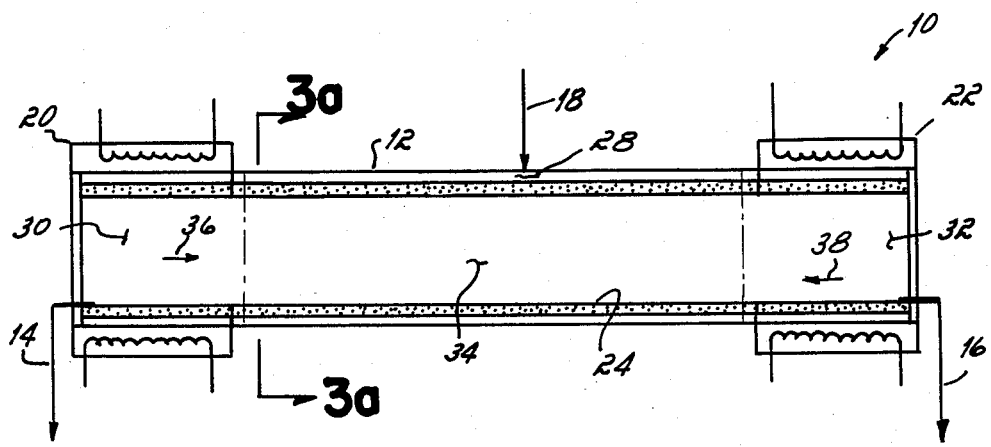
FIG. 2 is a schematic view of an apparatus according to this invention for separating components of a mixture according to their volatility.
Figure 5:
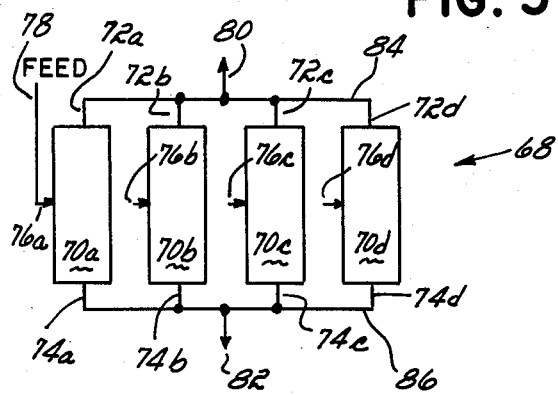
FIG. 5 is a schematic view of the apparatus of either FIG. 2 or 4 connected in a parallel arrangement.

One potential limitation of the separation apparatus 10 and 42 shown in FIGS. 2 and 4 is their relatively small capacity. This is overcome, at least to some degree, by combining several individual distillation apparatus 10 or sorbant column apparatus 40 together to form a separation structure with greater capacity. Referring now to FIG. 5 a separation apparatus 68 is provided which comprises a group of cylinders 70a–d arranged in parallel relation. The cylinders 70a–d are identical in construction and operation to either cylinder 12 or 42 described above and achieve a relatively complete separation of the components 80 and 82 of a mixture 78. Each of the cylinders 70a–d respectively, include an outlet 72a–d at one end, a second outlet 74a–d at the opposite end, and an individual inlet 76a–d for receiving the mixture 78. The outlets 72a–d are each connected to a common collection line 84 which receives the component 80 produced by each cylinder 70a–d. A second, common collection line 86 connects to each of the outlets 74a–d to receive the component 82 withdrawn at that end of such cylinder 70a–d. This arrangement enables several individual cylinders 70a–d to operate in combination so as to increase the volume of mixture 78 which can be separated.

Figure 6:
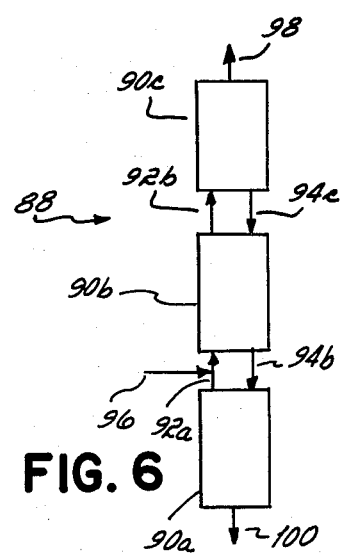
FIG. 6 is a schematic view of the apparatus of either FIGS. 2 or 4 connected in a series arrangement.

A similar result is achieved in the separation apparatus 88 of this invention shown in FIG. 6. Apparatus 88 comprises a group of cylinders 90a–c, each of which is identical in structure and operation to either apparatus 10 or 40 described above. As shown in FIG. 6, cylinder 90a is provided with an outlet 92a which connects to cylinder 90b, and, in turn, cylinder 90b is provided with an outlet 92b which connects to cylinder 90c. One component 98 of a mixture 96 flows directly through one cylinder 90a to another. In addition, cylinder 90c includes an outlet 94c connected to cylinder 90b, and cylinder 90b is connected by an outlet 94b to cylinder 90a. The mixture 96 is introduced at a single point along the apparatus 88 and its components 98 and 100 are separated in the identical manner as described above for the distillation apparatus 10 or sorbent column apparatus 40. One component 98 migrates in one direction directly through the cylinders 90a–c passing through outlets 92a, b. The other component 100 of the mixture 96 migrates in the opposite direction through cylinders 90a–c passing through outlets 94c, b. The apparatus 88 forms a series arrangement of cylinders 90a–c, in contrast to the parallel arrangement of cylinders 70a–d in apparatus 68, and provides an increased capacity for separating the components of a mixture.

Figure 7:
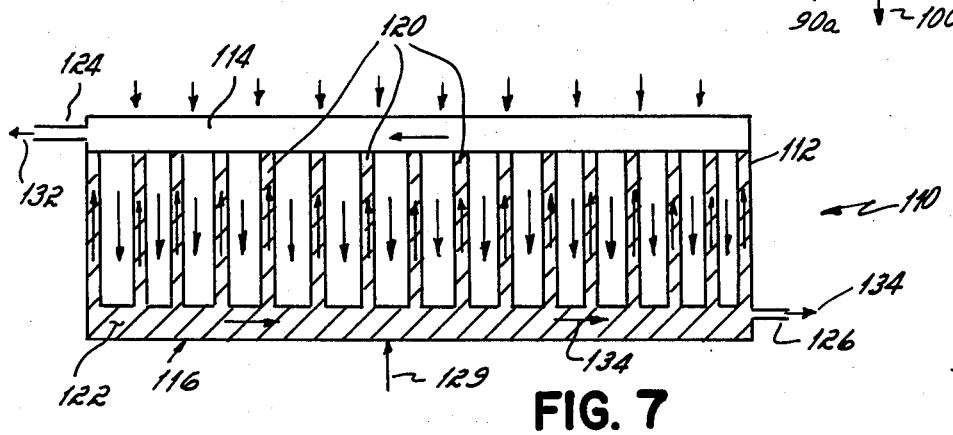
FIG. 7 is a schematic view, in partial cross section, of the apparatus of FIGS. 2 or 4 in which solar energy is used to create a zone of higher temperature.

Referring now to FIG. 7, a separation apparatus 110 is shown in which a zone of higher temperature is created by solar energy. Apparatus 110 comprises a cylinder 112 having one face or side 114 covered with a solar heat absorbing material such as a dark colored surface and an opposite side 116 facing away from the sun creating a zone of lower temperature. A plurality of spaced partitions 120 extend between the sides 114, 116 along the length of cylinder 112, each of which is formed or at least covered with a wick material such as glass fiber, wire screen or similar meterials. A section of wick material 122 is also disposed within the cylinder 112 along the side 116 of lower temperature. The ends of cylinder 112 are each provided with an outlet 124, 126, and and inlet 129 is positioned therebetween.

Apparatus 110 operates in substantially the identical fashion as the apparatus 10 and 40 discussed above. A mixture is introduced into cylinder 112 through inlet 128 where it is separated into one component 132 removed at outlet 124, and a second component 134 at outlet 126. The partitions 120 and wick section 122 provide a path for flow of the components 132, 134 in liquid phase by capillary force. The components 132, 134 are driven in vapor phase by the differential pressure developed within cylinder 112 between the partitions 120 to outlet 126. It is contemplated that apparatus 110 according to this embodiment of the invention would be particularly advantageous in the zero gravity environment of space where solar energy panels are commonly used.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of continuously separating components of a mixture, comprising the steps of:

continuously introducing said mixture into a cylinder structure having migration means capable of moving components in condensed phase independently of gravity;

producing a temperature differential in said cylinder structure forming a zone of higher temperature, a zone of lower temperature and an adiabatic zone between said zones of higher and lower temperature;

inducing by said temperature differential a countercurrent movement of said components within said cylinder structure, at least one component in vapor phase moving toward said zone of lower temperature, and at least one other component in condensed phase moving along said migration means toward said zone of higher temperature;

establishing a steady state of operation wherein said mixture is continuously introduced into said cylinder structure at said adiabatic zone and each of said components collects in concentrated form at respective zones of higher and lower temperature; and continuously removing said components from said cylinder structure at said zones of higher and lower temperature.

2. A method of distillation for continuously separating a more volatile component from a less volatile component of a mixture, comprising the steps of:

continuously introducing said mixture into a heat pipe structure having capillary means capable of inducing a capillary flow of components in condensed phase independently of gravity;

producing a temperature differential in said heat pipe structure forming a zone of higher temperature, a zone of lower temperature and an adiabatic zone between said zones of higher and lower temperature;

inducing by said temperature differential a countercurrent movement of said components within said heat pipe structure, said more volatile component in vapor phase moving toward said zone of lower temperature, and said less volatile component in condensed phase moving along said capillary means toward said zone of higher temperature;

establishing a steady state of operation wherein said mixture is continuously introduced into said heat pipe structure at said adiabatic zone, and wherein said more volatile component collects in concentrated form at said zone of lower temperature, and said less volatile component collects in concentrated form at said zone of higher temperature; and continuously removing said components from said heat pipe structure.

3. A method of continuously separating a more sorbable component from a less sorbable component of a mixture, comprising the steps of:

continuously introducing said mixture into a sorbent column structure having diffusion means capable of moving components in adsorbed phase by diffusion independently of gravity;

producing a temperature differential in said sorbent column structure forming a zone of higher temperature, a zone of lower temperature and an adiabatic zone between said zones of higher and lower temperature;

inducing by said temperature differential a countercurrent movement of said components within said sorbent column structure, said less sorbable component in vapor phase moving toward said zone of lower temperature, and said more sorbable component in adsorbed phase moving along said diffusion means toward said zone of higher temperature;

establishing a steady state of operation wherein said mixture is continuously introduced into said sorbent column structure at said adiabatic zone, and wherein said less sorbable component collects in concentrated form at said zone of lower temperature and said more sorbable component collects in concentrated form at said zone of higher temperature; and continuously removing said components from said sorbent column structure.

4. Distillation apparatus for continuously separating one component of a mixture from another component comprising:

a heat pipe structure;

means for continuously introducing said mixture into said heat pipe structure;

means disposed within said heat pipe structure capable of inducing a capillary flow of liquid therealong independently of gravity;

means for heating one zone of said heat pipe structure;

means mounted exteriorly of said heat pipe structure for cooling another zone of said heat pipe structure;

one of said components being vaporized at said heated zone of said heat pipe structure and migrating in vapor form toward said cooler zone of said heat pipe structure;

the other of said components being condensed at said cooler zone of said heat pipe structure and migrating in liquid form along said means for inducing capillary flow toward said heated zone of said heat pipe structure; and means for continuously removing said one component from said heated zone of said heat pipe structure, and for continuously removing said other component from said cooler zone of said heat pipe structure.

5. The distillation apparatus of claim 4 in which said heat pipe structure is a cylinder formed with at least two spaced outlets, and at least one inlet to receive said mixture.

6. The distillation apparatus of claim 4 in which said heat pipe structure comprises a group of cylinders, each of said cylinders including a first outlet for one of said components, a second outlet for the other of said components and an individual inlet to receive said mixture, said first outlets of said cylinders being connected to a common outlet line for removal of said one component and said second outlets of said cylinders being connected to a separate, common outlet line for removal of said other component.

7. The distillation apparatus of claim 4 in which said heat pipe structure comprises a group of cylinders, each of said cylinders including a first outlet for one of said components and a second outlet for the other of said components, said cylinders being arranged so that said first outlet of one cylinder connects to an adjacent cylinder and said second outlet of said adjacent cylinder connects to said one cylinder, whereby said one component migrates in vapor form through adjacent cylinders in one direction and said other component migrates in liquid form through adjacent cylinders in the opposite direction.

8. The distillation apparatus of claim 4 in which said means for heating one zone of said heat pipe structure forms an evaporator section of said heat pipe structure, and said means for cooling another zone of said heat pipe structure forms a condenser section of said heat pipe structure, said zone of said heat pipe structure between said heated and cooled zones forming an adiabatic section.

9. The distillation apparatus of claim 4 in which said means for heating one zone of said heat pipe structure is a dark colored surface solar heat absorbing medium.

10. The distillation apparatus of claim 4 in which said means for inducing capillary flow of a liquid is a wick structure disposed along the inner wall of said heat pipe structure.

11. Apparatus for continuously separating a more sorbable component of a mixture from a less sorbable component thereof comprising:

a sorbent column structure;

means for continuously introducing said mixture into said sorbent column structure;

adsorption means disposed within said sorbent column structure capable of adsorbing said components and moving said components therealong in adsorbed phase by surface diffusion independently of gravity;

means for heating one zone of said sorbent column structure;

means mounted exteriorly of said sorbent column structure for cooling another zone of said sorbent column structure;

said more sorbable component being adsorbed by said adsorption means and migrating therealong by surface diffusion in adsorbed phase toward said heated zone of said sorbent column structure;

said less sorbable component being desorbed at said heated zone and migrating in vapor phase toward said cooled zone of said sorbent column structure; and means for continuously removing said more sorbable component from said heated zone of said sorbent column structure, and for continuously removing said less sorbable component from said cooled zone of said sorbent column structure.

12. Apparatus as in claim 11 in which said adsorption means is a section of material chosen from the group of silica gel, activated charcoal, microporous glass, molecular sieves, alumina, zeolite, compressed graphite and microporous metal.

13. Apparatus as in claim 11 in which said sorbent column structure is a cylinder.

14. Apparatus as in claim 11 in which said adsorption means is disposed along the inner wall of said sorbent column structure.

* * * * *